United States Patent
Yang et al.

(10) Patent No.: US 7,337,089 B2
(45) Date of Patent: Feb. 26, 2008

(54) APPARATUS FOR MEASURING PICTURE AND LIFETIME OF DISPLAY PANEL

(75) Inventors: Yong Suk Yang, Daejeon (KR); Hye Yong Chu, Daejeon (KR); Jeong Ik Lee, Kyunggi-do (KR); Ji Young Oh, Daejeon (KR); Sang Hee Park, Daejeon (KR); Chi Sun Hwang, Daejeon (KR); Lee Mi Do, Daejeon (KR); Sung Mook Chung, Kyunggi-do (KR); Mi Kyung Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 382 days.

(21) Appl. No.: 11/176,734

(22) Filed: Jul. 7, 2005

(65) Prior Publication Data

US 2006/0049768 A1    Mar. 9, 2006

(30) Foreign Application Priority Data

Sep. 8, 2004    (KR) ...................... 10-2004-0071871

(51) Int. Cl.
*G06F 19/00*    (2006.01)

(52) U.S. Cl. ...................................... 702/182; 345/501

(58) Field of Classification Search ................ 702/182, 702/183–185, 188; 345/501, 502
See application file for complete search history.

(56) References Cited

FOREIGN PATENT DOCUMENTS

| KR | 10-20030033122 | 5/2003 |
|---|---|---|
| KR | 10-20030044661 | 6/2003 |
| WO | WO 01 63587 | 8/2001 |

*Primary Examiner*—Edward Raymond
(74) *Attorney, Agent, or Firm*—Ladas & Parry LLP

(57) ABSTRACT

Provided is an apparatus for measuring a picture and a lifetime of a display panel including: a chamber having at least one display panel for measurement disposed therein, and for uniformly maintaining temperature and humidity conditions of an inner portion; at least one camera installed in the chamber to obtain image signals of the display panel; a bias supply and measurement part for providing pulse bias voltage and current required to measure depending on control signals, and measuring the voltage and current to convert into digital data when the display panel is driven; a converter for converting the image signals obtained through the camera into digital data; and a control and data processing part for generating parameters by receiving the digital data from the bias supply and measurement part and the converter, and analyzing a lifetime of the display panel using the parameters.

13 Claims, 7 Drawing Sheets

APPARATUS FOR MEASURING PICTURE AND LIFETIME OF DISPLAY PANEL

CROSS-REFERENCE TO RELATED APPLICATION

This application claims priority to and the benefit of Korean Patent Application No. 2004-71871, filed Sep. 8, 2004, the disclosure of which is incorporated herein by reference in its entirety.

BACKGROUND

1. Field of the Invention

The present invention relates to an apparatus for measuring a picture and a lifetime of a display panel such as LCD, TFT-LCD and OLED and, more particularly, to an apparatus for measuring a picture and a lifetime of a display panel capable of rapidly and precisely measuring characteristics concerned with brightness reduction and a lifetime.

2. Discussion of Related Art

As information and communications industry is advanced, a mobile phone, an audio, a monitor, a digital still camera, a large-screen TV and so on have been widely used, and therefore, various display panels such as a liquid crystal display (LCD), a thin film transistor liquid crystal display (TFT-LCD), and an organic light emitting diode (OLED) have been developed and produced.

However, since these display panels have also disadvantages, while having various advantages, various efforts has been attempted in order to improve these disadvantages.

For example, the OLED has various advantages such as emissive characteristics, high efficiency, wide viewing angle, rapid response speed, low power consumption and so on, however, it has also disadvantages such as device deterioration due to reaction with moisture and oxygen in atmosphere, lifetime reduction due to oxidation of electrodes, and so on.

In order to solve these problems, it is required to find and observe the problems in a developing process of the display panel to improve various characteristics and lifetime. For this, it is necessary to provide an apparatus for observing the display panel.

A. B. Chwang et al, and K, Yamashita et al had measured the relationship between current, voltage and brightness of devices using a brightness meter adopting a driving theory of an organic light emitting display or measurement apparatuses adopting a photo diode, and had observed the lifetime of the encapsulated devices therethrough (A. B. Chwang et al, Applied Physics Letters 83 (2003), p. 413; and K, Yamashita et al Journal of Physics D: Applied Physics, 34, (2001), p. 740).

In addition, Korean Patent Application No. 10-2001-0075499 discloses a method of measuring brightness variations depending on variations of current and voltage using a brightness meter capable of moving in directions of x, y and z axes.

However, these methods cannot observe in detail an entire surface of the display panel since the display panel is partially measured using optical instruments such as a brightness meter or a photo diode, and it is difficult to analyze in a short amount of time since the optical instruments should intermittently measure while scanning along x-axis or y-axis in order to observe the characteristics of the large-screen display panel. In addition, since it is impossible to discriminate and analyze in detail causes seriously affecting the lifetime of the device such as dark spots generated and grown in the display panel, edge degradation of an emission surface, variations of uniformity depending on variations of electric power and so forth, it is difficult to find methods capable of improving the lifetime of the device.

SUMMARY OF THE INVENTION

The present invention is directed to an apparatus for measuring a picture and a lifetime of a display panel capable of observing and measuring an entire surface of the display panel as well as a portion of a pixel.

The present invention is also directed to an apparatus for measuring a picture and a lifetime of a display panel capable of generating various physical parameters from brightness and image digital data of the display panel, and analyzing the lifetime of the display panel using the parameters.

One aspect of the present invention is to provide an apparatus for measuring a picture and a lifetime of a display panel that includes: a chamber having at least one display panel for measurement disposed therein, and for uniformly maintaining temperature and humidity conditions of an inner portion; at least one camera installed in the chamber to obtain image signals of the display panel; a bias supply and measurement part for providing pulse bias voltage and current required to measure depending on control signals, and measuring the voltage and current to convert into digital data when the display panel is driven; a converter for converting the image signals obtained through the camera into digital data; and a control and data processing part for generating parameters by receiving the digital data from the bias supply and measurement part and the converter, and analyzing a lifetime of the display panel using the parameters.

The apparatus may further include: a first switching part for selectively connecting the bias supply and measurement part and the display panel depending on a first control signal provided from the control and data processing part; and a second switching part for selectively connecting the camera and the converter based on a second control signal provided from the control and data processing part.

The control signals may be provided from the control and data processing part.

The pulse bias voltage may include: a first voltage applied to the display panel for a first time; and a second voltage applied for measurement of current and operation of the camera for a second time when the display panel is driven. The first time may be longer than the second time, and the first voltage may be higher than the second voltage.

The pulse bias current may include: a first current applied to the display panel for a first time; and a second current applied for measurement of voltage and operation of the camera for a second time when the display panel is driven. The first time may be longer than the second time, and the first current may be larger than the second current.

In addition, the pulse bias voltage may include: a first voltage applied to the display panel for a first time; a second voltage applied to the display panel for a second time; and a third voltage applied for measurement of current and operation of the camera for a third time when the display panel is driven. The first voltage may be higher than the second voltage, and the third voltage may be equal to or higher than the second voltage.

In addition, the pulse bias current may include: a first current applied to the display panel for a first time; a second current applied to the display panel for a second time; and a third current applied for measurement of voltage and operation of the camera for a third time when the display panel is driven. The first current may be larger than the second current, and the third current may be equal to or larger than the second current.

The camera operates depending on the voltage supplied from the bias supply and measurement part, and it includes a lens and an optical filter that adjusts the amount of incident light.

The parameters may include an average luminance (L), a luminance RMS roughness (dL), a voltage (V), a ratio of dark and bright areas (R, $R_N$), an edge degradation depth (D) of depending on periphery reduction of the bright area of a picture, the number of isolated dark spots, a nucleation rate of the dark spots (N'), and a growth rate of the dark spots (G').

BRIEF DESCRIPTION OF THE DRAWINGS

The above and other features and advantages of the present invention will become more apparent to those of ordinary skill in the art by describing in detail exemplary embodiments thereof with reference to the attached drawings in which.

DETAILED DESCRIPTION OF PREFERRED EMBODIMENTS

The present invention will now be described more fully hereinafter with reference to the accompanying drawings, in which exemplary embodiments of the invention are shown. This invention may, however, be embodied in different forms and should not be construed as limited to the embodiments set forth herein. Rather, these embodiments are provided so that this disclosure is thorough and complete and fully conveys the scope of the invention to those skilled in the art.

Figure 1:
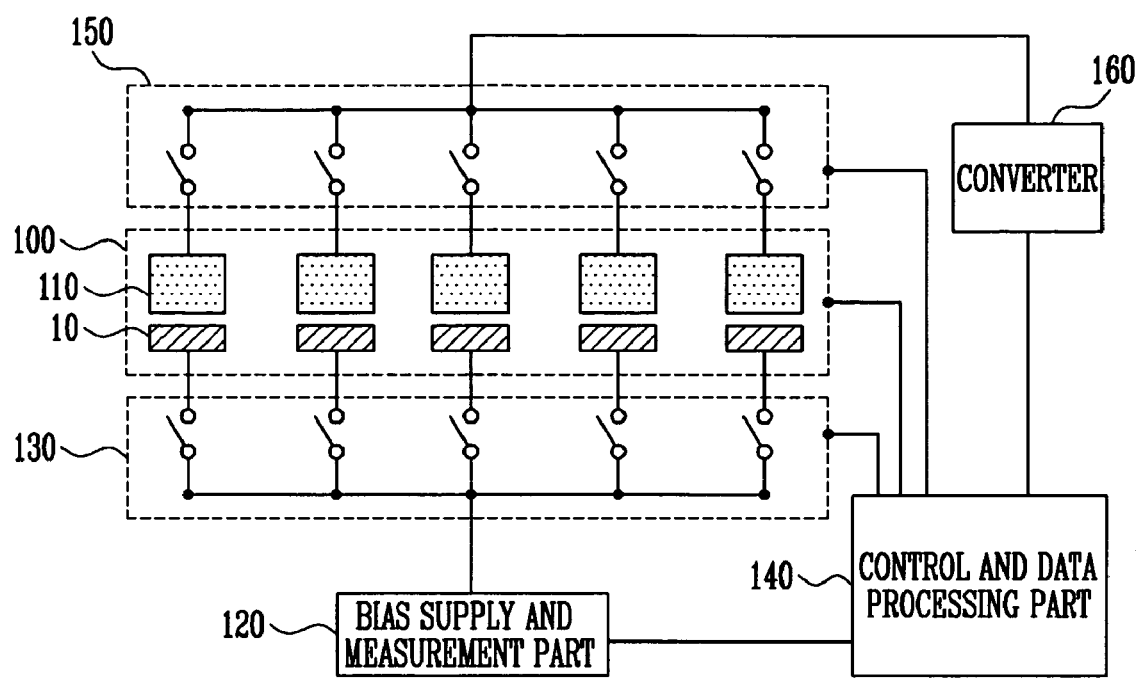
FIG. 1 is a schematic view of an apparatus for measuring a picture and a lifetime of a display panel in accordance with the present invention.

FIG. 1 is a schematic view of an apparatus for measuring a picture and a lifetime of a display panel in accordance with the present invention.

In order to uniformly maintain measurement conditions, an optical camera 110 for measuring brightness and a picture of a display panel is installed in a constant temperature and humidity chamber 100 capable of making an atmosphere from low temperature and dry to high temperature and high humidity. In order to simultaneously measure a plurality of display panels, a plurality of cameras 110 may be arranged in an array type. The camera 110 includes an optical lens, and an optical filter for adjusting the amount of light may be attached to the lens. For example, a ⅓ inch black/white or color CCD or CMOS camera may be used, and a wide angle lens with a focal distance of 35 mm that can observe an entire surface of the display panel or a magnifying lens with a focal distance of 35 mm that can locally observe a certain pixel part of the display panel may be used.

The display panel 10 provided for measurement is aligned and disposed in front of the camera 110 by a stage (not shown). The display panel 10 may be LCD, TFT-LCD, OLED display, and so on.

Pulse bias voltage and current for measurement are provided to electrodes of the display panel 10, for example, an anode electrode and a cathode electrode, from a bias supply and measurement part 120. That is, in the case of a voltage driving display panel such as LCD or PDP, a pulse voltage is provided to electrodes of the display panel 10, and in the case of a current driving display panel such as OLED, a pulse current is provided to electrodes of the display panel 10.

The bias voltage and current are selectively supplied to the desired anode and cathode electrodes of the display panel 10 by a switching part 130 including a plurality of switches and/or relay. For example, the bias supply and measurement part 120 supplies the bias voltage to the desired panel 10 through the switching part 130, or sequentially supplies the bias voltage to a plurality of display panels 10 depending on control signals provided from a control and data processing part 140. In addition, the bias supply and measurement part 120 measures the driving voltage and current from the display panel into which the bias voltage was supplied, and converts the voltage and current into digital data analyzable by a computer to transmit the data to the control and data processing part 140.

Meanwhile, the image signal of the display panel 100 photographed by the camera 110 is selectively transmitted to a converter 160 by a switching part 150. At this time, the switching part 150 is operated to transmit the image signal obtained from the desired display panel 10 to the converter 160, or to sequentially transmit the image signal obtained from the plurality of display panels 10 to the converter 160, depending on the control signals provided from the control and data processing part 140.

The converter 160 converts the image signal to digital data analyzable by the computer to transmit to the control and data processing part 140. The control and data processing part 140 stores the digital data received from the converter 160 and the digital data received from the bias supply and measurement part 120 and analyzes the data to generate various physical parameters, thereby measuring characteristics and lifetime of the display panel using the parameters. In addition, the analyzed results are graphically processed to images such as a histogram graph, a contour-map image, a 3-dimensional image depending on brightness and so on to be provided to a user. These parameter generation and graphic process may be sequentially performed through a prepared program or depending on requirements of the user, and the digital data of the stored image signal may be provided as a graphic file or a moving picture file.

Hereinafter, a process of measuring a lifetime of the display panel using a measurement apparatus configured as hereinabove will be described.

Embodiment 1

The display panel for measurement is an OLED (organic light emitting diode). The OLED includes an anode electrode, a hole injection layer, a hole transport layer, an emission layer, an electron transport layer, an electron injection layer, and a cathode electrode formed on a transparent substrate.

The anode electrode is formed of a transparent oxide such as ITO, and the cathode electrode is formed in a stacked structure of LiF of 2 nm and Al of 75 nm. The hole transport layer is formed of 4,4',4''-tris(N-3(3-methylphenyl)-N-phenylamino)triphenyl amine (MTDATA) of 20 nm, the emission layer is formed of N,N'-diphenyl-N,N'-bis(3-methylphenyl)-bis(3-methylphenyl)-(1,1'-biphenyl)-4,4'-diamine (TPD) of 40 nm, and the electron transport layer is formed of $Alq_3$ of 60 nm.

The OLED has an emission area of a diode display panel of 4 $mm^2$, and it is measured in the state that a passivation layer is not formed on a surface.

First, temperature and humidity in the constant temperature and constant humidity chamber 100 are uniformly maintained at 18° C. and 40% depending on control signals provided from the control and data processing part 140 so that the display panel, which is to be measured, can maintain a physical stable state.

After disposing the display panel 10 on a stage in the constant temperature and constant humidity chamber 100, the camera 110 is disposed in front of the display panel 10. In this embodiment, a wide angle lens of a focal distance of 35 mm that can observe an entire surface of the display panel and a neutral optical filter for adjusting the amount of incident light entered through the lens are attached to a ⅓ inch black/white CCD camera. The optical filter functions to reduce the light emitted from the display panel to obtain an optimal picture.

Figure 2A:
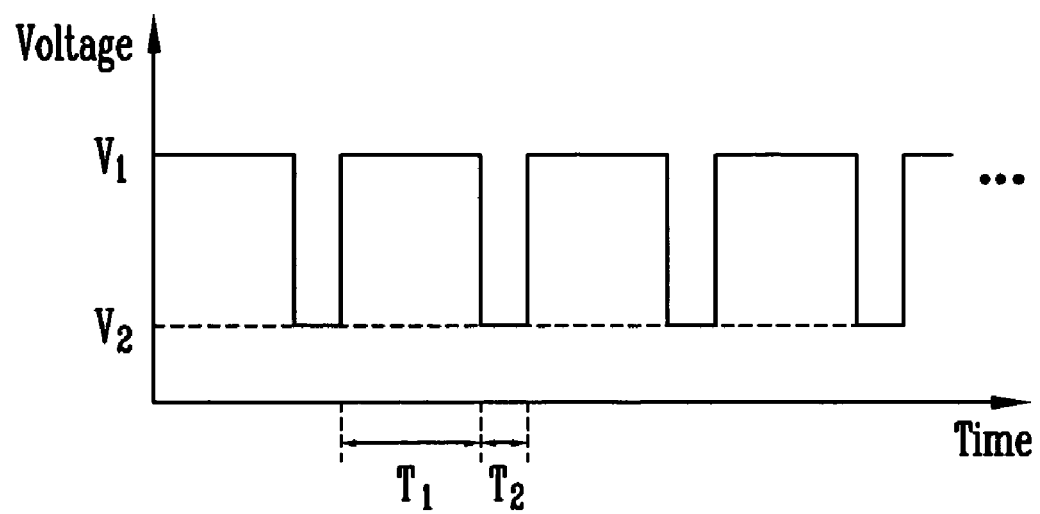
FIGS. 2A and 2B are voltage and current waveforms illustrating an example of a bias voltage provided for measurement from a bias supply and measurement part shown in FIG. 1.
Figure 2B:
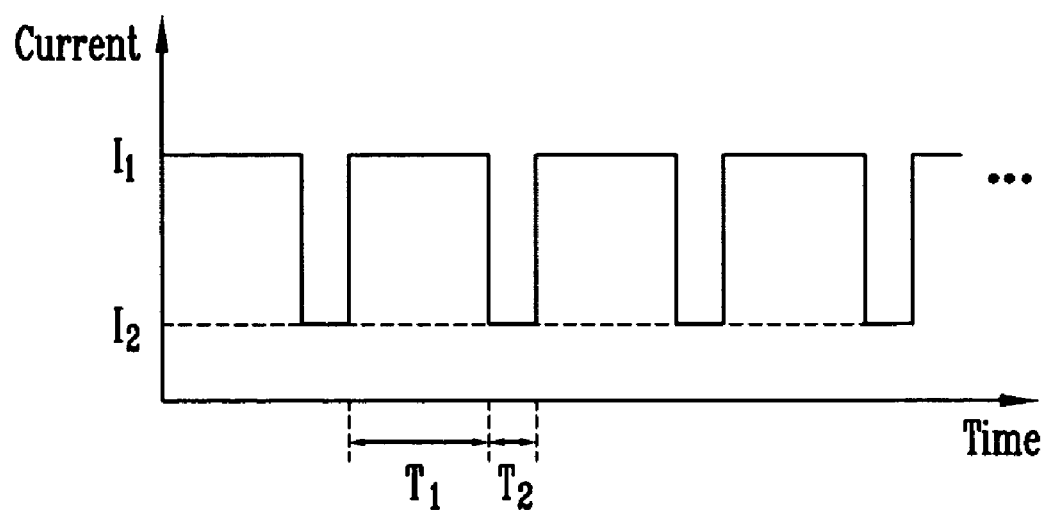

The bias supply and measurement part 120 supplies pulse bias voltages V1 and V2 required for measurement to anode and cathode electrodes of the desired display panel 10 through the switching part 130 depending on control signals provided from the control and data processing part 140. At this time, as shown in FIGS. 2A and 2B, the bias supply and measurement part 120 provides the pulse voltages $V_1$ and $V_2$ and currents $I_1$ and $I_2$ having a constant period.

The voltage $V_1$ is a bias voltage applied to the anode electrode of the display panel 10 for the time $T_1$, and the voltage $V_2$ is provided for current measurement and operation of the camera 110 for the time $T_2$ when the display panel 10 is driven. In addition, the current $I_1$ is a bias current flowing to the anode electrode of the display panel 10 for the time $T_1$, and the current $I_2$ is provided for voltage measurement and operation of the camera 110 for the time $T_2$ when the display panel 10 is driven. In this process, the time $T_1$ is longer than the time $T_2$, the voltage $V_1$ is higher than the voltage $V_2$, and the current $I_1$ is larger than the current $I_2$.

For example, the current $I_1$ of 0.2 mA and the current $I_2$ of 0.01 mA are supplied to the anode electrode of the display panel 10 by a predetermined period. The current $I_1$ is supplied to accelerate the lifetime of the device, and the current $I_2$ is supplied when the driving voltage is measured and while the camera 10 photographs the display panel.

The current $I_2$ is supplied every 30 seconds after supplying the current $I_1$ for the first time to the display panel 10, and the camera 110 photographs the display panel 10. At this time, the current $I_2$ is applied for the time of not more than 0.01 second approximately. After 3000 seconds, the camera 10 photographs the display panel 10 every 300 seconds.

Magnitude and period of the bias voltage may vary depending on driving types and characteristics of the display panel, which is to be measured.

The image signal photographed by the camera 10 is selectively transmitted to the converter 160 according to the operation of the switching part 150, and converted to digital data analyzable by a computer at the converter 160 to be transmitted to the control and data processing part 140. Pictures photographed by the camera 10 are shown in FIGS. 3A and 3B.

Figure 3A:
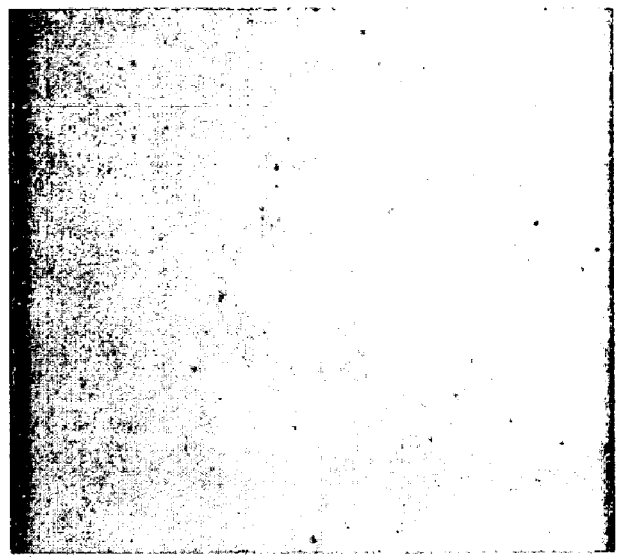
FIGS. 3A and 3B are photographs of a display panel obtained through a camera shown in FIG. 1.
Figure 3B:
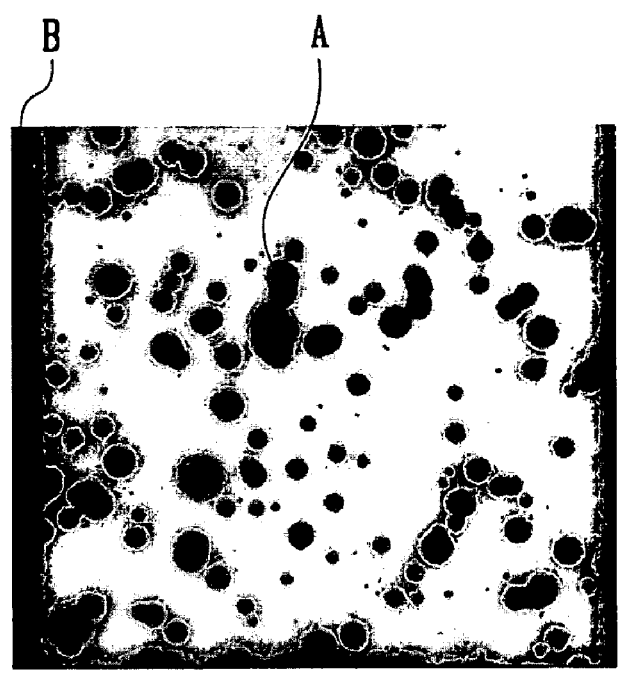

FIG. 3A is the picture obtained at the measurement start time, and FIG. 3B is the picture obtained after 24 hours. While an emission surface maintains a uniform state at the first time, as the driving time lapses, dark spots A and edge degradation B are generated to make the emission surface irregular.

The control and data processing part 140 analyzes the digital data of the image signal provided from the converter 160 and the digital data of the voltage and current provided from the bias supply and measurement part 120 to generate the following parameters.

Figure 4:
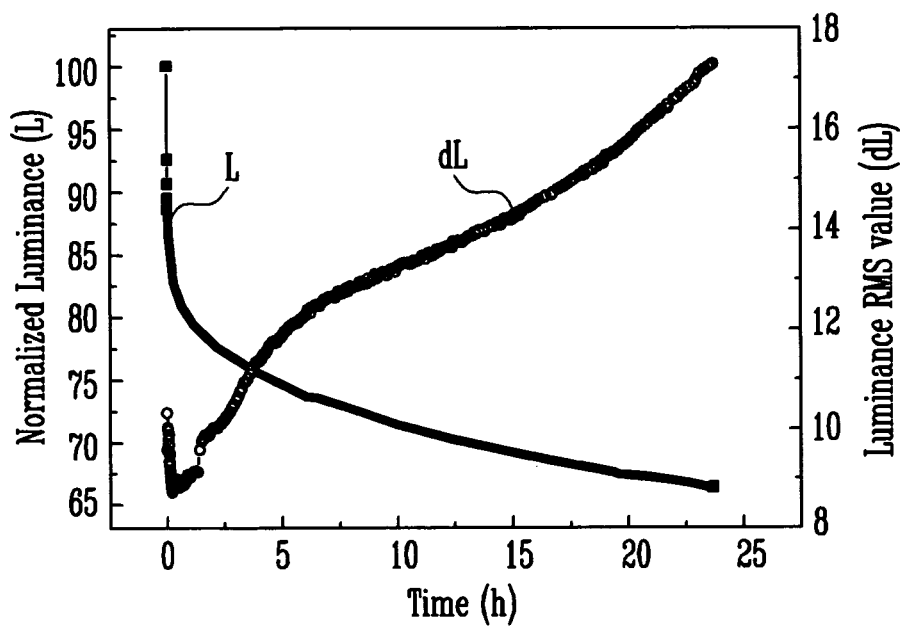
FIG. 4 is a graph of time vs parameters such as average luminance (L) and luminance RMS roughness (dL)

FIG. 4 is a graph of time vs parameters such as average luminance (L) and luminance RMS (root-mean-square) roughness (dL).

The average luminance L is a value that the sum of emission values obtained from each pixel of the picture shown in FIGS. 3A and 3B is divided by a total area, and the luminance RMS roughness dL is a standard deviation value of the average luminance L. While the average luminance L is continuously decreased as time lapses, the luminance RMS roughness dL is decreased and then increased again.

Figure 5:
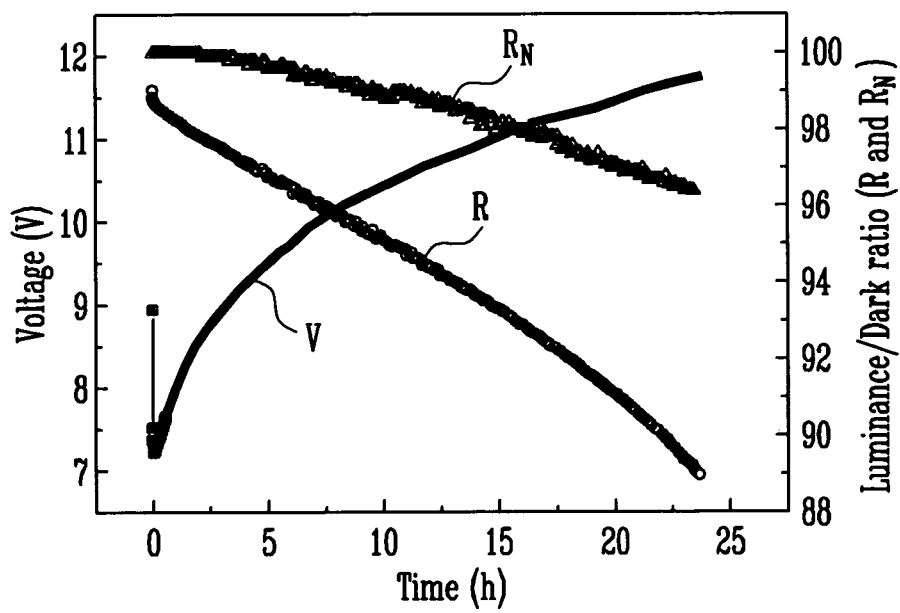
FIG. 5 is a graph of time vs parameters such as a voltage (V) and a ratio of dark and bright areas (R, $R_N$)

FIG. 5 is a graph of time vs parameters such as a voltage (V) and a ratio of dark and bright areas (R, $R_N$).

The dark area of the display panel is caused due to dark spots generated and grown therein and edge degradation of the emission surface. The dark area is defined as a region that brightness of a pixel is not more than 60% of L value $L_0$ initially measured, R is a ratio of the dark area with respect to the total area, and $R_N$ is a ratio of an area darkened by the dark spots with respect to the total area. As time lapses, the voltage $V_1$ is decreased and then increased again, and the ratios R and $R_N$ are continuously decreased.

Figure 6:
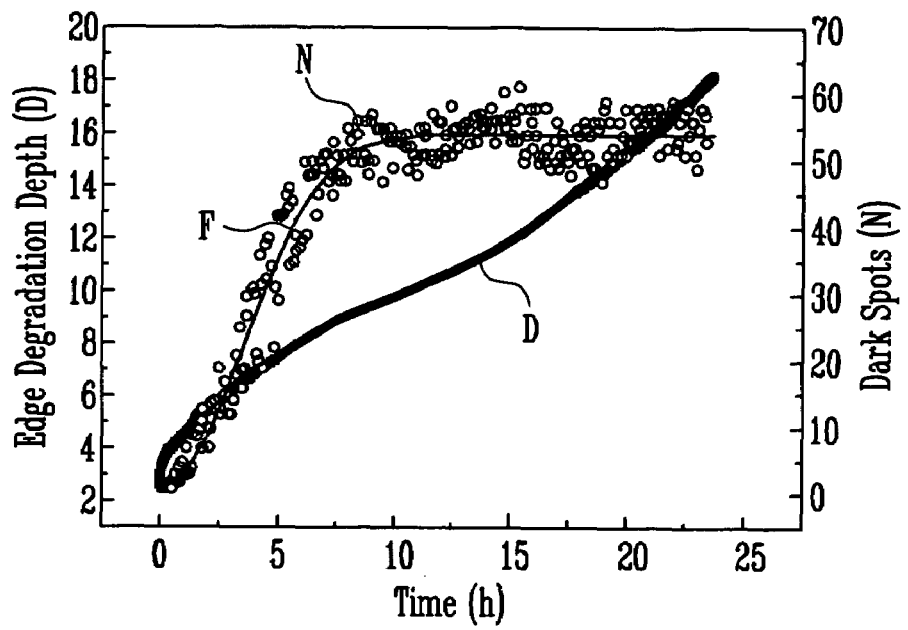
FIG. 6 is a graph of time vs parameters such as an edge degradation depth (D) depending on edge degradation of the bright portion of a picture and the number of isolated dark spots.

FIG. 6 is a graph of time vs parameters such as an edge degradation depth (D) depending on edge degradation of the bright portion of a picture and the number of isolated dark spots.

The edge degradation depth D is an average value of right and left surfaces, and a fitting line F represented along the number N of isolated dark spots is a result calculated by Avrami formula (see S. H. Kim et al, synthetic metals 111-112 (2000), p. 253). As time lapses, the edge degradation depth D is increased, and the number N of isolated dark spots is increased along an S-shaped curved line.

Figure 7:
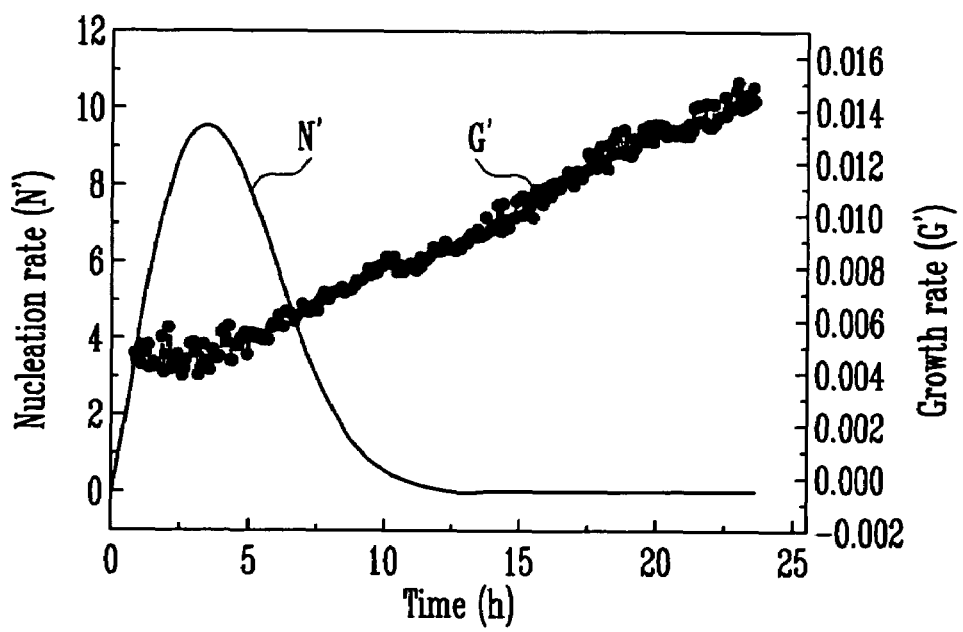
FIG. 7 is a graph of time vs parameters such as a nucleation rate of the dark spots (N'), and a growth rate of the dark spots (G')

FIG. 7 is a graph of time vs parameters such as a nucleation rate of the dark spots (N'), and a growth rate of the dark spots (G').

The nucleation rate N' of the dark spots means the number of dark spots generated per unit time at the measured picture, and is shown using the fitting line of Avrami.

The growth rate G' of the dark spots means a value that the total area of the dark spots of the photographed picture is divided by the number of dark spots, taken the square root of the divided value, and then divided by 3.14159. As time lapses, the nucleation rate N' of the dark spots is increased and then decreased, the growth rate G' of the dark spots maintains a certain state and then increased together with reduction of the nucleation rate N' of the dark spots. It means that when the dark spots are generated and the number of the dark spots increases, the average size of the dark spots does not increase, while when the dark spots are not generated anymore, the average size of the dark spots increases.

Therefore, it is possible to precisely analyze brightness reduction and lifetime of the display panel through analysis of the parameters, and it is possible to specifically find the causes affecting lifetime characteristics such as dark spots.

Embodiment 2

Figure 8A:
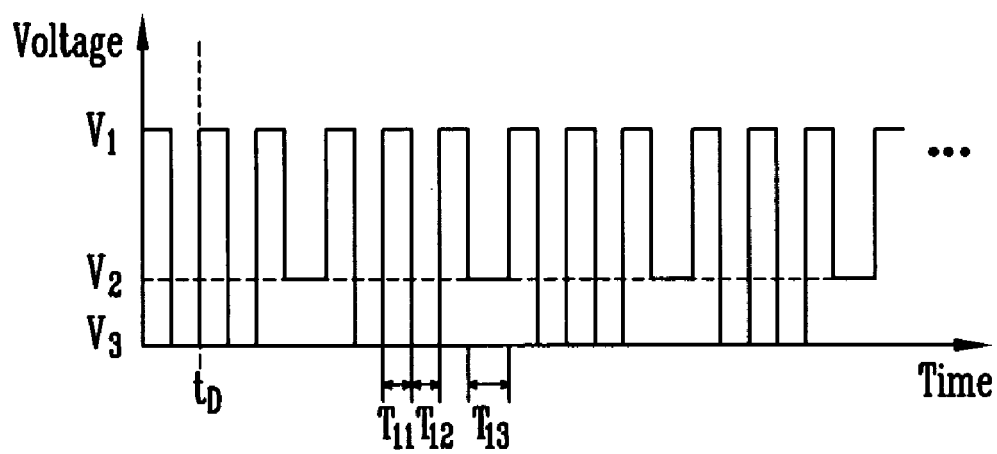
FIGS. 8A and 8B are voltage and current waveforms illustrating another example of a bias voltage provided for measurement from a bias supply and measurement part shown in FIG. 1.
Figure 8B:
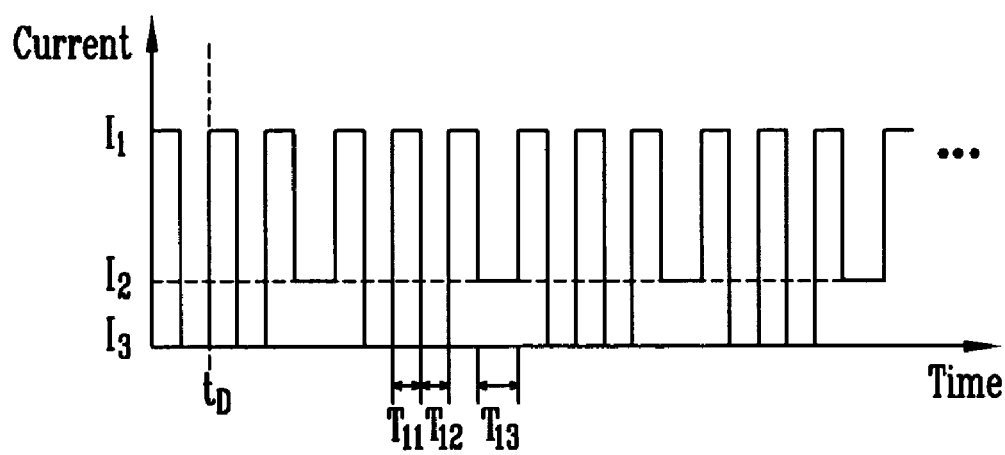

While the same display panel 10 as Embodiment 1 is used and the measurement is performed in the same conditions, the camera 110 is composed of a ⅓-inch black/white CCD camera with a wide-angle lens of a focal distance of 35 mm that can observe an entire surface of the display panel. That is, as shown in FIGS. 8A and 8B, Embodiment 2 does not employ an optical filter, unlike Embodiment 1 employing the optical filter for reducing light emitted from the display panel, and it is possible to measure by varying pulse types of the bias voltages $V_1$, $V_2$ and $V_3$ provided from the bias supply and measurement part 120 without employing the optical filter.

The voltage $V_1$ is a maximum bias voltage applied to the anode electrode of the display panel 10 for a time $T_{11}$, the voltage $V_3$ is a minimum bias voltage applied to the anode electrode of the display panel 10 for a time $T_{12}$, and the voltage $V_2$ is provided for current measurement and operation of the camera 10 for a time $T_{13}$ when the display panel 10 is driven. In addition, the current $I_1$ is a maximum bias current flowing to the anode electrode of the display panel 10 for the time $T_{11}$, the current $I_3$ is a minimum bias current flowing to the anode electrode of the display panel 10 for the time $T_{12}$, and the current $I_2$ is provided for voltage measurement and operation of the camera 110 for the time $T_{13}$ when the display panel is driven. In this process, the voltage $V_1$ is higher than the voltage $V_3$, the voltage $V_2$ is equal to or higher than the voltage $V_3$, the current $I_1$ is larger than the current $I_3$, and the current $I_2$ is equal to or larger than the current $I_3$.

For example, the current $I_1$ of 0.2 mA and the current $I_3$ of 0 mA are supplied to the anode electrode of the display panel 10 by a predetermined period (for example, 50 Hz), and the current $I_2$ of 0.01 mA is supplied by varying the pulse period while the camera photographs the display panel 10 to make brightness of the display panel 10 instantly lower, thereby obtaining a picture having appropriate brightness without using the optical filter.

Figure 9:
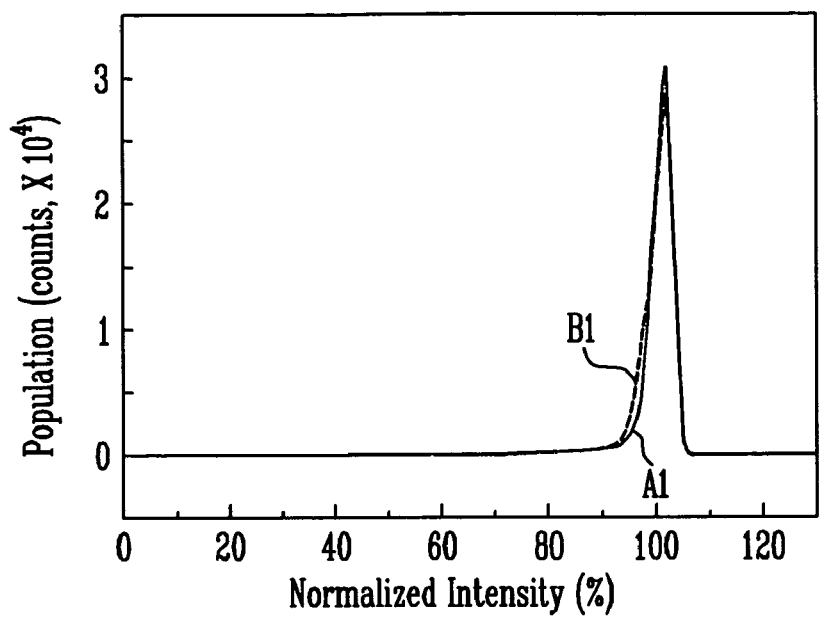
FIG. 9 is a histogram graph that measured when a bias current is applied.

FIG. 9 is a histogram graph that measured when a bias current $I_1$ of 1 mA is applied to the anode electrode of the display panel 10. The histogram graph is a graph representing emission values obtained from each pixel in the picture obtained through the camera 10 in statistics distribution. A line A1 is a result obtained from Embodiment 2, and a line B1 is a result obtained from Embodiment 1. It is possible to obtain a similar result by varying only the pulse period without using the optical filter.

Figure 10:
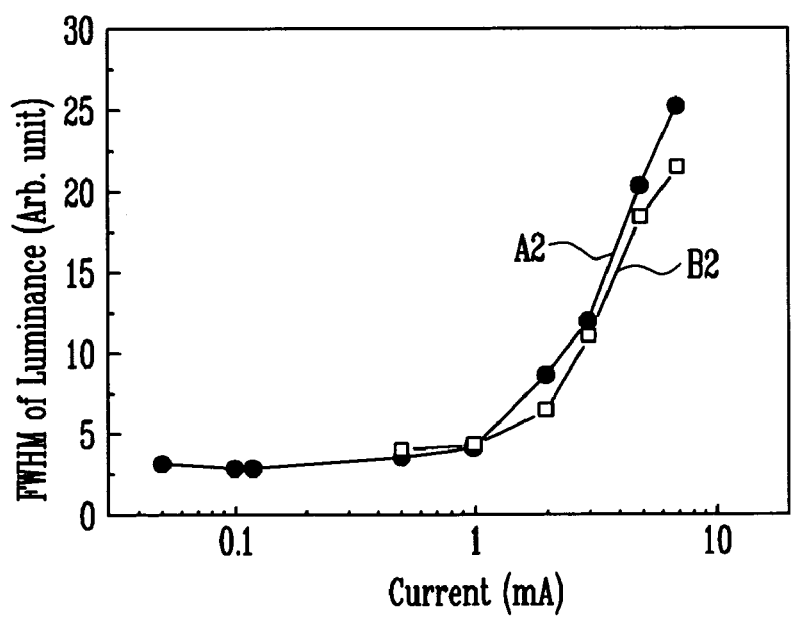
FIG. 10 is a graph of FWHM values of peaks depending on the current obtained through the result of FIG. 9.

FIG. 10 is a graph of full width at half maximum (FWHM) values of peaks depending on the current obtained through the result of FIG. 9, and the bias current $I_1$ is applied in the range of 0.05 mA to 7 mA. A line A2 is a result obtained from Embodiment 2, and a line B2 is a result obtained from Embodiment 1. In both cases, substantially equal values and tendency are shown.

As can be seen from the foregoing, the present invention generates various physical parameters from brightness and image digital data of the display panel, and specifically analyzes causes of brightness reduction such as dark spots and edge degradation and lifetime using these parameters. Therefore, it is possible to readily analyze even in the case of an irregular emission state, to precisely analyze the emission state from the large screen display panel to a pixel having a micrometer size, and to selectively analyze a portion such as edges or center according to an observer's will.

The apparatus for measuring a picture and a lifetime of a display panel is capable of being adapted to the display panel regardless of its type, and simultaneously and rapidly measuring and analyzing a plurality of display panels.

Although the present invention has been described with reference to certain exemplary embodiments thereof, it will be understood by those skilled in the art that a variety of modifications and variations may be made to the present invention without departing from the spirit or scope of the present invention defined in the appended claims, and their equivalents.

What is claimed is:

1. An apparatus for measuring a picture and a lifetime of a display panel, comprising:
    a chamber having at least one display panel for measurement disposed therein, and for uniformly maintaining temperature and humidity conditions of an inner portion;
    at least one camera installed in the chamber to obtain image signals of the display panel;
    a bias supply and measurement part for providing pulse bias voltage and current required to measure depending on control signals, and measuring the voltage and current to convert into digital data when the display panel is driven;
    a converter for converting the image signals obtained through the camera into digital data; and
    a control and data processing part for generating parameters by receiving the digital data from the bias supply and measurement part and the converter, and analyzing a lifetime of the display panel using the parameters.

2. The apparatus according to claim 1, further comprising:
    a first switching part for selectively connecting the bias supply and measurement part and the display panel depending on a first control signal provided from the control and data processing part; and
    a second switching part for selectively connecting the camera and the converter depending on a second control signal provided from the control and data processing part.

3. The apparatus according to claim 1, wherein the control signals are provided from the control and data processing part.

4. The apparatus according to claim 1, wherein the pulse bias voltage comprises:
    a first voltage applied to the display panel for a first time; and
    a second voltage applied for measurement of current and operation of the camera for a second time when the display panel is driven.

5. The apparatus according to claim 4, wherein the first time is longer than the second time, and the first voltage is higher than the second voltage.

6. The apparatus according to claim 1, wherein the pulse bias voltage comprises:
   a first voltage applied to the display panel for a first time;
   a second voltage applied to the display panel for a second time; and
   a third voltage applied for measurement of current and operation of the camera for a third time when the display panel is driven.

7. The apparatus according to claim 6, wherein the first voltage is higher than the second voltage, and the third voltage is equal to or higher than the second voltage.

8. The apparatus according to claim 1, wherein the pulse bias current comprises:
   a first current applied to the display panel for a first time; and
   a second current applied for measurement of voltage and operation of the camera for a second time when the display panel is driven.

9. The apparatus according to claim 8, wherein the first time is longer than the second time, and the first current is larger than the second current.

10. The apparatus according to claim 1, wherein the pulse bias current comprises:
    a first current applied to the display panel for a first time;
    a second current applied to the display panel for a second time; and
    a third current applied for measurement of voltage and operation of the camera for a third time when the display panel is driven.

11. The apparatus according to claim 10, wherein the first current is larger than the second current, and the third current is equal to or larger than the second current.

12. The apparatus according to claim 1, wherein the camera is operated based on the voltage supplied from the bias supply and measurement part, and comprises a lens and an optical filter adjusting the amount of incident light.

13. The apparatus according to claim 1, wherein the parameters comprise an average luminance (L), a luminance RMS roughness (dL), a voltage (V), a ratio of dark and bright areas (R, $R_N$), an edge degradation depth (D) depending on periphery reduction of the bright area of a picture, the number of isolated dark spots, a nucleation rate of the dark spots (N'), and a growth rate of the dark spots (G').

* * * * *